United States Patent [19]
Fukuju et al.

[11] Patent Number: 4,853,798
[45] Date of Patent: Aug. 1, 1989

[54] METHOD AND APPARATUS FOR REPRODUCING DIGITAL OR ANALOG SIGNALS

[75] Inventors: Yujio Fukuju, Yokohama; Makoto Niiro, Sagamihar, both of Japan

[73] Assignee: Sony Corporation, Tokyo, Japan

[21] Appl. No.: 515,820

[22] Filed: Jul. 21, 1983

[51] Int. Cl.⁴ ............................ G11B 5/09; G11B 5/02; G06F 11/00
[52] U.S. Cl. .................................... 360/38.1; 360/47; 371/38; 371/65
[58] Field of Search ........................ 360/47, 38.1, 48; 371/8, 65, 38

[56] References Cited

U.S. PATENT DOCUMENTS

| | | | |
|---|---|---|---|
| 3,761,903 | 9/1973 | Bird, Jr. et al. | 360/47 |
| 4,202,018 | 5/1980 | Stockham, Jr. | 360/47 |
| 4,211,997 | 7/1980 | Rudnick et al. | 371/38 |
| 4,254,500 | 3/1981 | Brookhart | 360/53 X |
| 4,323,934 | 4/1982 | Giraud | 360/38.1 X |
| 4,328,580 | 5/1982 | Stockham, Jr. et al. | 371/65 X |
| 4,382,299 | 5/1983 | Dieterich | 360/38.1 X |
| 4,389,681 | 6/1983 | Tanaka | 360/48 |

FOREIGN PATENT DOCUMENTS 52-46806   4/1977   Japan .................................. 360/38.1

Primary Examiner—Stuart N. Hecker
Assistant Examiner—Alyssa H. Bowler
Attorney, Agent, or Firm—Lewis H. Eslinger; Jay H. Maioli

[57] ABSTRACT

A tape player includes digital and analog reproducing sections for playing back a magnetic tape having recorded thereon encoded digital data arranged in data blocks and an analog signal running parallel to the digital data. A switching circuit in the digital reproducing section includes an error-detecting circuit that indicates the presence of errors or data drop-outs and a width detector that provides an initial error signal when a predetermined consecutive number of data blocks contain errors or are not being reproduced. A decoder provides decoded digital information and a remaining error signal when an uncorrected error is encountered. The remaining error signal is generated with a predetermined delay after the digital data is read from the tape. If the initial error signal is present when the remaining error signal is generated, an AND circuit and a flip-flop in the switching circuit generate a switching signal to substitute the analog signal for the digital signal.

14 Claims, 2 Drawing Sheets

FIG.4A FIG.4B FIG.4C FIG.4D FIG.4E

METHOD AND APPARATUS FOR REPRODUCING DIGITAL OR ANALOG SIGNALS

BACKGROUND OF THE INVENTION

1. Field of the Invention

The present invention relates to a method and apparatus for reproducing digital or analog signals from a recording medium and, more particularly, for reproducing an analog signal from the medium when the corresponding digital signal cannot be reproduced.

2. Description of the Prior Art

The fidelity of the reproduction of an original analog signal that is magnetically recorded can be greatly enhanced if the original signal is recorded in digital form by a technique such as pulse code modulation (PCM). Then, when the digital signal is played back, it is re-converted into the original analog signal.

A problem encountered in digital recording and reproduction is erroneous digital information, that is, digital data that does not accurately represent the original analog signal. Techniques are available to "correct" all but the most serious data errors. Sometimes errors result from the absence of digital data being reproduced from the recording medium ("drop-outs"). In that event another approach is used: The original signal is also recorded on the medium in analog form and when drop-outs are encountered in the reproduced digital data, the analog form of the recorded signal is used as a substitute for the digital signal.

The implementation of that approach requires the detection of the drop-out and the timely substitution of the analog signal reproduced from an analog track on the recording medium. A conventional technique, disclosed in published Japanese Pat. No. 52-46806, published on Apr. 14, 1977, and applied for by TEAC on Oct. 13, 1975, in the name of Akira Sato, can substitute the analog signal for the digital signal in the event of a drop-out. A fault in that approach, however, lies in its inability to allow for drop-outs that are correctable and thus need not be replaced by the analog signal. It also does not substitute the analog signal when the uncorrectable errors in the digital data are caused by other kinds of data errors. Thus, the analog signal cannot be used as a substitute when other kinds of digital data errors are encountered.

SUMMARY OF THE INVENTION

It is an object of the present invention to overcome the aforementioned disadvantages in the prior art.

It is another object of the present invention to provide a reproducing apparatus for playing back from a recording medium a digital signal and a corresponding analog signal in which the analog signal is substituted for the digital signal when necessary because of any kind of digital data error, but not when the errors are correctable.

It is a further object of the present invention to provide a method for providing an analog signal from a recording medium in lieu of a corresponding encoded digital signal when necessary because of any kind of digital data error, but not when the errors are correctable.

In accordance with one aspect of the present invention, an initial error signal is generated when a detecting signal indicates that a predetermined proportion of the digital data being reproduced from a recording medium contains errors. Decoded information corresponding to the original analog signal and a remaining error signal indicating the presence of errors in the decoded information are generated from the encoded digital data at a predetermined delay after it is reproduced from the medium. A switching signal is generated if the initial error signal is present with the remaining error signal, and the reproduced analog signal replaces the reproduced digital information in response to the switching signal.

The above and other objects features and advantages of the present invention will be apparent when the following detailed description of illustrative embodiments of the invention is considered in connection with the drawings.

BRIEF DESCRIPTION OF THE DRAWINGS

FIG. 2 depicts the arrangement of digital data on a magnetic tape suitable for reproduction by the apparatus shown in FIG. 1.

FIGS. 3A-3F data errors on the magnetic tape shown in FIG. 2 and the waveforms of signals produced in response thereto by the apparatus shown in FIG. 1.

FIGS. 4A-4E depict data errors on the magnetic tape shown in FIG. 2 and the waveforms of signals produced in response thereto, as shown in FIG. 3, but on an enlarged time scale as compared to that used in FIG. 3.

DETAILED DESCRIPTION OF AN ILLUSTRATIVE EMBODIMENT

Figure 1:
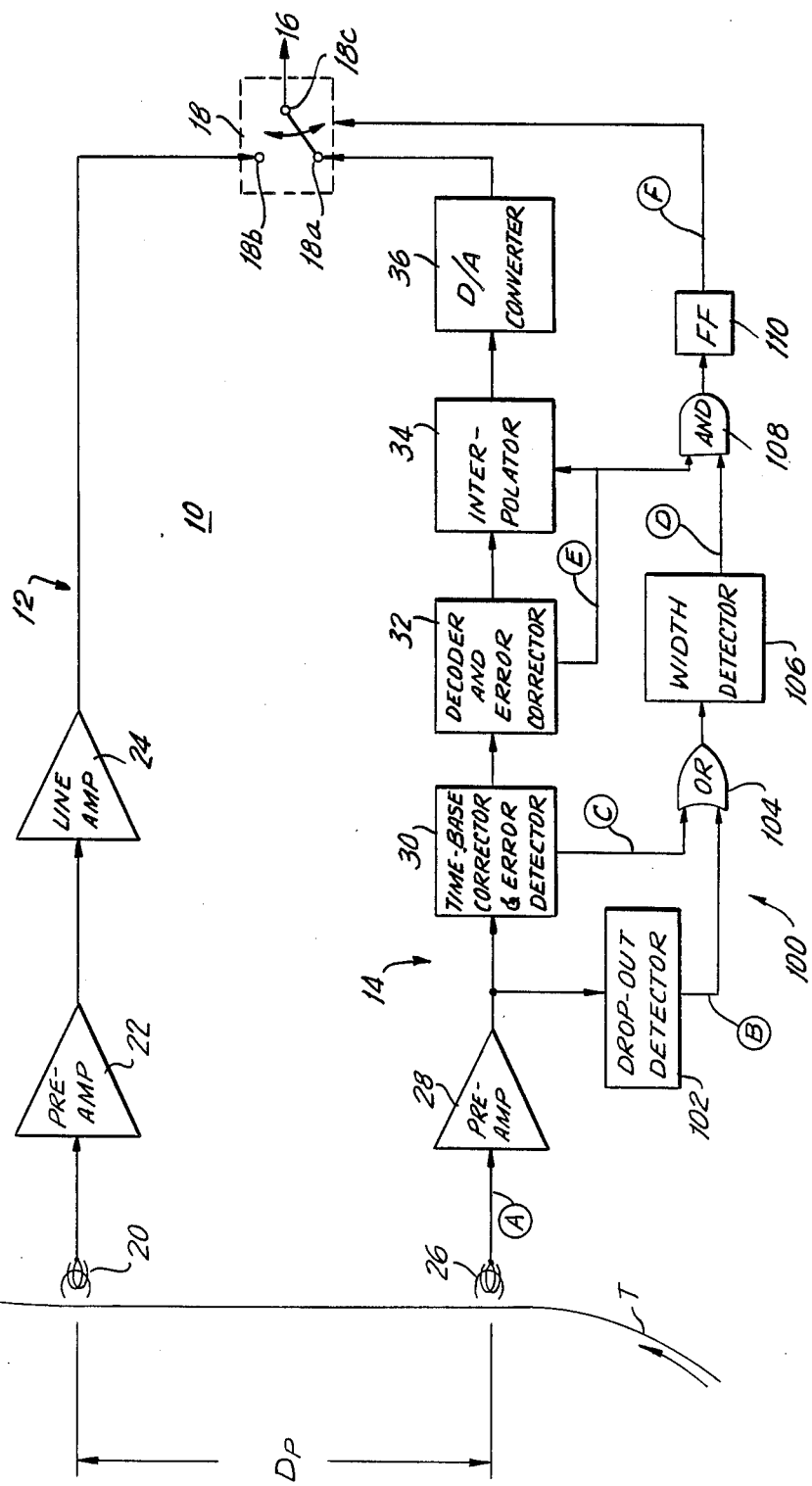
FIG. 1 is a schematic diagram of a tape recording and reproducing apparatus incorporating a switching apparatus in accordance with the present invention.

FIG. 1 schematically depicts a tape recording and reproducing apparatus 10 (referred to in this specification as a "tape player" for the sake of brevity) having an analog reproducing section 12 and a digital reproducing section 14. An output line 16 provides a signal, which corresponds to the original signal recorded on a longitudinally extending tape T, for further use. For example, the output line 16 can be used for driving loudspeakers or earphones when the original signal recorded on the tape represents audio information.

A switch 18 is interposed between the analog section 12 and the digital section 14. The switch 18 has a first contact 18a that receives the output of the digital section 14, and a second contact 18b that receives the output of the analog section 12. A movable contact 18c supplies a signal to the output line 16 of the apparatus 10.

The analog reproducing section 12 comprises a conventional magnetic analog playback head 20 as an analog reproducing means. The output from the analog playback head 20 is provided to an analog pre-amplifier 22, the output of which is supplied to an analog line amplifier 24, in a conventional manner. The output of the line amplifier 24 is provided to the contact 18b of the switch 18.

The digital reproducing section 14 comprises a conventional magnetic digital playback head 26 as a digital reproducing means. The output A of the digital playback head 26 is provided to a digital pre-amplifier 28. The output of the digital pre-amplifier 29 is supplied to an error-detecting means comprising a time-base corrector and error detector circuit 30. The signal from the error-detecting circuit 30 is applied to a decoder and error-corrector circuit 32. An interpolater 34 accepts the output of the decoder circuit 32 and provides a decoded, error-corrected digital signal to a digital-to-analog (D/A) converter 36. The output of the D/A converter 36 corresponds to the original analog signal recorded on the tape. The decoder circuit 32, the interpolater 34 and the D/A converter 36 thus comprise a decoding means that provides to the contact 18a of the switch 18 decoded analog information derived from the encoded digital data on the tape T.

In the present invention the digital reproducing section 14 includes a switching circuit 100 for providing to the output line 16 the reproduced analog signal in the event that errors in the digital data reproduced from the tape are so serious that the digital data is, in effect, unavailable.

The switching system 100 shown in FIG. 1 includes a drop-out detector 102 that accepts the output of the digital pre-amplifier 28. The drop-out detector 102 generates a drop-out signal B. An OR circuit 104 accepts one output C of the error-detecting circuit 30 and the output of the drop-out detector 102. A width detector 106 accepts the output of the OR circuit and provides an output D that comprises one input to an AND circuit 108. The other input E to the AND circuit 108 is provided by the decoder circuit 32. The output of the AND circuit 108 is provided to a flip-flop 110, the output of which comprises a switching signal F for actuating the switch 18 to change its state from providing the decoded digital signal to the output 16 to providing the analog signal thereto.

The digital reproducing section 14 of the tape recorder 10 provides a signal at its output representative of a digital signal recorded on a tape T in the encoded form shown in FIG. 2. The digital information words $W_1$–$W_{12}$ represent the original signal in a digital form, such as that which results from PCM recording. Parity words $P_O$, $P_E$, $Q_O$ and $Q_E$ are derived from the words $W_1$–$W_2$ for use by the decoder 32 for error-correcting. The information words $W_1$–$W_{12}$, the parity words $P_O$, $P_E$, $Q_O$ and $Q_E$, the synchronizing signal SYNC and the CRC word, all of which are comprised of an equal number, say 16, bits, are recorded on the tape T in data blocks, each of which takes a predetermined time to record. A typical tape speed and recording format requires about 1 msec to record each block on the tape. The time required for recording one block of data on the tape T (here 1 msec) corresponds to the duration of the original signal represented by 12 of the information words $W_1$–$W_{12}$. (Consequently, the duration of each reproduced word is shorter than the duration of the original signal it represents.)

The information words $W_1$–$W_{12}$ in one block, however, do not correspond to consecutive samples of the original signal. The time-interleaving technique used to encode the information distributes each twelve information words $W_1$–$W_{12}$ created by successive samples of the original signal throughout 324 data blocks, or one "frame". Thus, it takes about 324 msec to reproduce any twelve consecutive samples of the original signal.

As the tape T passes the digital playback head 26, the digital data depicted in FIG. 2 is reproduced and provided to the digital pre-amplifier 28 as the signal A. The output of the pre-amplifier 28 is supplied to the time-base correcting and error-detection circuit 30 which, among other functions, provides a detecting signal C each time a CRC word is encountered which indicates the presence of an error in its associated data block. The circuit 30 thus comprises an error-detecting means that provides a detection signal that indicates the existence of errors in the digital data being reproduced from the medium. The time-base of the digital data from the digital pre-amplifier 28 is also adjusted by the circuit 30.

The decoding and error-correcting circuit 32 then receives the encoded digital data from the detecting circuit 30 and provides the information words ($W_1$–$W_{12}$) in the order in which they were created by sampling the original signal. To perform that decoding operation the circuit 32 must operate on an entire frame, or 324 blocks, of data at a time. In addition, de-interleaving and error-correcting the data takes a finite amount of time after the frame has been read into the circuit 32. The decoder circuit 32 also produces the remaining error signal E that indicates the presence of an error in the decoded data that could not be corrected using the parity words $P_O$, $P_E$, $Q_O$ and $Q_E$.

The digital information words, de-interleaved and in their original order, are provided to the interpolating circuit 34. Any missing word, resulting from an uncorrectable error, is supplied by interpolation in response to the remaining error signal E. The stream of data thus reproduced is converted to analog form in the D/A converter 36 and provided to the contact 18a of the switch 18.

The operation of the switching system 100 according to the present invention will now be described with reference to FIGS. 3A–3F and FIGS. 4A–4E.

Referring first to FIGS. 3A–3F, which show in more general terms the principle of operation of the present invention, the left-hand sides of these views illustrate the operation of the present invention if the data error is a drop-out of data and the right-hand sides of these views illustrate how the present invention operates if a series of errors ("disorders") persists a sufficient length of time to justify switching to the analog signal.

If a drop-out occurs, as shown in the left-hand side of FIG. 3A, a drop-out signal B from the drop-out detector 102 goes to a higher level as shown in FIG. 3B, and stays there for the length of the drop-out. If the drop-out lasts a predetermined time, the width detector 104 generates an initial error signal D, as shown in FIG. 3D, which is provided to the AND circuit 108. The detecting circuit 30 also provides the signal C in response to the drop-out, as shown in FIG. 3C. (The signal C is considered in more detail below.) Meanwhile, the signal A provided from the tape T and processed by the circuit 30 has been provided to the decoder circuit 32. The circuit 32 provides the remaining error signal E to the AND circuit 108 after a time $T_D$ has passed since the drop-out passed the digital playback head 26. That is, at some point the drop-out will produce an error that cannot be corrected using the parity words, and the decoder 32 will thus generate the remaining error signal E (FIG. 3E). Since both inputs to the AND circuit 108 are then at a higher level, the flip-flop 110 is triggered and provides the switching signal F (FIG. 3F) to the switch 18. The switching signal F actuates the switch 18 to connect the analog reproducing section 12 to the output line 16.

The present invention thus is able to provide the output line 16 with the analog signal instead of the decoded digital signal when a drop-out is encountered that represents a "burst error" in the data being reproduced from the tape. That is, when the error is of a type that indicates a serious malfunction, such as a malfunction of the digital playback head 26, the switch 18 is actuated to provide instead the analog signal from the tape T. The width detector 106 can be set to provide the initial error signal D (FIG. 3D) any predetermined time $\tau$ after a drop-out begins. In the present embodiment $\tau$ is chosen to be approximately equal to $T_D$. In other words, it is assumed in the illustrated embodiment that if a drop-out lasts as long as the delay $T_D$ (caused primarily by the decoding circuit 32) that drop-out indicates a significant interruption of digital data from the tape.

The right-hand sides of FIGS. 3A–3F show the operation of the present invention in the case of a data disorder. As FIG. 3B shows, a data disorder will not cause the drop-out detector 102 to generate the drop-out signal B because data is being supplied by the digital playback head 26. However, the CRC word in each block will indicate the presence of errors. On the time scale used in FIG. 3C, the detecting signal C appears as a single pulse. As is described in more detail in connection with FIG. 4C, the detecting signal C can be a series of short pulses generated in response to the playback of each CRC word and the detection of an error in successive blocks. In any case, the width detector 106 provides an initial error signal D if the detecting signal C is present for a predetermined number of consecutive data blocks, which generally correspond to a predetermined playback time $\tau$. Meanwhile, the disordered data is being processed by the decoding circuit 32. If an error cannot be corrected, the circuit 32 provides the remaining error signal E (FIG. 3E). Thus, if $\tau$ is set at 400 msec, the initial error signal D from the width detector 106 indicates that some 400 consecutive data blocks contain an error. Of course, the length of the initial error signal D can be set as desired. Generally, the initial error signal D will last as long as the drop-out or disorder. In any case, when the remaining error signal E is generated, both inputs to the AND circuit 108 are at the higher level and the switching signal F shown in FIG. 3F is generated.

FIGS. 4A–4E show the operation of the present invention on a greatly enlarged time scale. FIG. 4A shows a data drop-out or disorder beginning at, say, $W_2$ of a particular data block. If we assume that $W_1$ of that particular data block is the information word derived from the beginning of a group of samples, beginning at time $t = t_o$, of the original signal, then the remaining information words $W_2$–$W_{12}$ from that sample, because of the interleaving technique used in the present embodiment, are distributed in the next 323 data blocks. The information word $W_2$ in the particular data block beginning the data drop-out or disorder comprises the second information word of a previous group of samples of the original signal and might be correctable. $W_1$ of that data block, however, will not be correctable if the drop-out or disorder lasts for a time $t = t_o + 324$ msec (that is, long enough to play back all of the information words $W_1$–$W_{12}$ from the group of samples of the original analog signal beginning with $W_1$) If $t = t_o + 400$ msec, then $W_1$ will not be correctable. Thus, the remaining error signal E shown in FIG. 4E is generated about 400 msec after the digital playback head 26 reproduces $W_1$.

FIG. 4B shows the drop-out signal B generated by the drop-out detector 102. If a complete drop-out of data begins at the location on the tape indicated in FIG. 4A, then the output of the drop-out detector 102 will be as shown in FIG. 4B. (The phantom lines in FIG. 4B show that no drop-out signal is generated for a data disorder.) FIG. 4C shows the detecting signal C from the time-base correcting and error-detecting circuit 30.

In the embodiment shown, the signal C is a series of pulses substantially coinciding with the playback of CRC words indicating errors in their associated data blocks. Alternatively, suitable circuitry could be provided to generate a single pulse, shown in dotted lines in FIG. 4C, for as long as consecutive data blocks have a CRC word indicating the presence of an error. FIG. 4C represents the detecting signal C from the circuit 30 whether there is a data drop-out or disorder.

The initial error signal D generated by the width detector is shown in FIG. 4D. It goes to a high level if the drop-out or a data disorder lasts a time $t = t_o + \tau$. FIG. 4E shows the remaining error signal E. Of course, the signal E goes to a high level at the same time whether the remaining error is the result of a drop-out or disorder.

When the switching signal F is generated, it actuates the switch 18 to connect the analog reproducing section 12 to the output line 16. Assume that it is desired to begin providing the analog signal as close as possible to the point corresponding to the sample of the original signal represented by the particular information word $W_1$ shown in FIG. 4A at the beginning of the drop-out or disorder. To do that the analog signal representative of the original signal at that point must arrive at the switch terminal 18b when the switching signal F is generated. Assume it takes a switching delay $T_S$ from the passage of that information word $W_1$ by the digital playback head 26 until the generation of the switching signal F. $T_D$ is measured from the time the first word $W_1$ in any given group of 12 consecutive samples passes the digital playback head 26. In the present example $T_S$ is substantially the same as $T_D$, since the first information word $W_1$ of a particular group of samples of the original signal "caused" the remaining error signal E. However, $T_S$ could be less than $T_D$, if, say, the drop-out or disorder begins with a different digital information word derived from those same 12 consecutive samples of the original signal. Let $T_A$ be an analog delay, or the time it takes for the portion of the analog signal passing the analog playback head 20 to reach the switch terminal 18b. ($T_A$ is, of course, much shorter than $T_S$.) If the analog signal is to be provided in place of the digital information word causing the remaining error signal E, a delay must be provided between the time that particular information word passes the digital playback head 26 and when the corresponding portion of the analog signal reaches the analog playback-head 26. If that delay is called $T_P$, then for the same part of the original signal to be at the switch terminal 18b when the switching signal F is provided, the relationship $T_P + T_A = T_S$ must be satisfied. If the reproducing speed is R, then the analog playback head 20 must be displaced from the digital playback head 26 by a distance $D_P = R \times T_P$.

The respective information words $W_1$–$W_{12}$ in successive data blocks shown in FIG. 2 are from respective samples of the analog signal. That is, a word $W_1$ in one block is derived from the first sample of any given group of 12 consecutive samples of the original analog signal. The word $W_1$ in the next data block is derived from the thirteenth sample (or the first sample of the next group of 12 consecutive samples) of the original signal following that from which the word $W_1$ of the preceding block data block was derived. The same is true of the words $W_2$–$W_{12}$. A word $W_2$ in any given data block results from the thirteenth sample of the original signal following the sample used to derive the word $W_2$ for the preceeding data block. Thus, the analog signal can be recorded on the tape generally in line with the digital signal. In other words, even though the digital information words $W_1$–$W_{12}$ from any 12 consecutive samples of the original signal are distributed over 324 data blocks on the tape, the analog signal can be recorded generally in line with the digital signal because the same information word $W_x$ in successive blocks is separated by a length equal to the length between samples of the analog signal corresponding to that word.

To illustrate, refer to FIG. 2 and let the information word $W_1$ in a data block 1 be called $_1W_1$. If the information word in data block 2 is $_2W_1$, and so on, the analog signal can be recorded next to the digital signal with the portion of the analog signal represented by the information word $_1W_1$ aligned with that word. Then, the portion of the analog signal represented by the information word $_2W_1$ will be aligned with that word, and so on. The same arrangement could be provided for any of the other digital information words $W_2$–$W_{12}$.

As pointed out above, the information words $W_1$–$W_{12}$ from a particular twelve consecutive samples of the original analog signal, and the parity words $P_E$, $P_O$, $Q_E$ and $Q_O$ derived from them, are distributed throughout 324 data blocks. Furthermore, they are not necessarily distributed in those blocks in the order in which they were generated. That is, a typical distribution might have $W_1$ in a particular data block, say block 1, and the remaining words distributed as follows:

| | |
|---|---|
| $W_2$ - Block 205 | $W_{10}$ - Block 239 |
| $W_3$ - Block 86 | $W_{11}$ - Block 120 |
| $W_4$ - Block 290 | $W_{12}$ - Block 324 |
| $W_5$ - Block 18 | $P_O$ - Block 52 |
| $W_6$ - Block 222 | $P_E$ - Block 256 |
| $W_7$ - Block 103 | $Q_O$ - Block 69 |
| $W_8$ - Block 307 | $Q_E$ - Block 273 |
| $W_9$ - Block 35 | |

While that distribution aids error-correction, it also makes it necessary as a practical matter to convert to the analog signal whenever the switching signal F is generated in response to an uncorrectable error in any of the information words $W_1$–$W_{12}$ from a particular consecutive 12 samples of the original signal. That can be appreciated by considering that the analog signal inherently must be recorded on the tape in its original form and cannot be "spread around" to match the digital signal. For example, if information words $W_1$–$W_3$ are correctable, but $W_4$–$W_{12}$ are not, it will not be possible to convert to the analog signal at the point on the tape where the digital information word $W_4$ is located and then begin to reproduce the analog signal because it could result either in missing fairly large portions of the original signal or in replaying some portions that have already been digitally reproduced.

Practically, then, the delay $T_P$ will be set so that the analog signal is substituted from the point corresponding to the location on the tape T of that part of the analog signal corresponding to the first information word $W_1$ in the data block in which the first uncorrectable error occurred.

To illustrate, assume that the analog signal which is recorded on the tape T parallel to the digital data, is aligned transverse to the direction of tape travel so that the analog signal portions corresponding to the information words $W_1$ are generally aligned with those words. It will take the delay $T_D$ from the time an information word $W_1$ in a particular data block passes the digital playback head 26 until a remaining error signal E associated with that data block is produced. If it is assumed that the delay between the production of the remaining error signal E and the generation of the switching signal F is negligible, then $D_P$ should be chosen so that $D_P = (T_D - T_A) \times R$. Of course, if the analog signal is aligned with a different information word, $D_P$ will be changed accordingly.

Thus, the present invention provides a method and apparatus that will provide substantially uninterrupted playback of a digitally recorded signal even if data disorders not comprising complete data drop-outs are encountered. The above embodiment has been described in connection with signals recorded on magnetic tape. Those skilled in the art will recognize that other mediums ca be used for recording signals to be reproduced in accordance with the present invention.

Of course, those skilled in the art will recognize that modifications to the present invention, other than those specifically mentioned above, can be made without departing from the invention. For example, the initial error signal D could be generated if a particular proportion other than 100% of the data blocks contain an error. Therefore, the scope of the invention is defined solely by the following claims.

We claim:
1. Apparatus for reproducing from a recording medium having recorded thereon encoded digital data and a corresponding analog signal, the apparatus comprising:
   error-detecting means for providing a detecting signal indicating the existence of errors in the encoded digital data being reproduced from the medium;
   initial error signal generating means responsive to said detecting signal for generating an initial error signal when said detecting signal indicates that at least a predetermined proportion of the digital data contains errors;
   decoding means for accepting the encoded digital data and generating, in response thereto and at a predetermined delay after reproduction thereof, corresponding error-corrected decoded information and a remaining error signal indicating the presence of uncorrectable errors in the decoded information;
   switch means for selectively providing to an output line of the apparatus either the analog signal reproduced from the medium or said decoded information; and
   switching signal generating means for providing a switching signal to actuate said switch means to provide the analog signal being reproduced from the medium to the output line only in response to the simultaneous generation of said initial error signal and said remaining error signal.
2. Apparatus as in claim 1; wherein:
   the digital data is arranged on the medium in substantially regular data blocks, each of which includes an associated error-detecting word for indicating the presence of an error in the encoded data being reproduced from the associated data block;
   said error-detecting means provides said detecting signal in response to the indication by the error-detecting word of the presence of an error in the data from an associated data block; and
   said initial error signal generating means provides said initial error signal when said detecting signal indicates the presence of an error in a predetermined number of consecutive data blocks.

3. Apparatus as in claim 2; wherein:
said error-detecting means comprises a drop-out detector for generating a drop-out signal indicating the absence o digital data being reproduced from the medium; and
said initial error signal generating means provides said initial error signal when said drop-out signal indicates the absence of digital data being reproduced from the medium for a predetermined duration substantially the same as the time required to reproduce said predetermined number of consecutive data blocks.

4. Apparatus as in claim 2; wherein:
the digital data on the medium is derived by sampling an original analog signal at a predetermined rate and generating corresponding digital information words arranged on the medium with a predetermined number of information words in each data block and with the same predetermined number of consecutive samples of the original signal being distributed among a predetermined plurality of data blocks;
the analog signal on the medium is derived directly from the original analog signal and is arranged on the medium in a predetermined relation to the digital data; and
said decoding means generates decoded digital data used for deriving said decoded information and said remaining error signal in response to an uncorrected information word at said predetermined delay after reproduction of all of said predetermined number of consecutive samples of the original signal.

5. Apparatus as in claim 4; wherein:
the recording medium is a longitudinally extending magnetic tape and the data blocks are arranged longitudinally on the tape for passage by at least one digital reproducing means at a predetermined rate; and
said initial error signal generating means provides said initial error signal when said detecting signal indicates the presence of errors in consecutive data blocks for a time substantially the same as said predetermined delay.

6. Apparatus for reproducing from a longitudinally extending magnetic tape having recorded thereon encoded digital data and a corresponding analog signal, the digital data on the tape being derived by sampling an original analog signal at a predetermined rate and generating corresponding digital information words arranged on the tape in substantially regular data blocks each of which includes a predetermined number of data words and an associated error-detecting word for indicating the presence of an error in the encoded data being produced from the associated data block and with the same predetermined number of consecutive samples of the original signal being distributed among a predetermined plurality of data blocks, the data blocks arranged longitudinally along the tape for passage by at least one digital reproducing means of said apparatus at a predetermined rate, and in which the analog signal on the tape is derived directly from the original analog signal and is arranged on the tape in a predetermined relation to the digital data, the apparatus comprising:
error-detecting means for providing a detecting signal indicating the existence of errors in the encoded digital data being reproduced from the tape in response to the indication by the error-detecting word of the presence of an error in the data from an associated data block;
initial error signal generating means responsive to said detecting signal for generating an initial error signal when said detecting signal indicates that at least a predetermined proportion of the digital data, corresponding to the presence of errors in consecutive data blocks for a selected time, contains errors;
decoding means for accepting the encoded digital data and generating decoded digital data used for deriving error-corrected decoded information corresponding to the encoded digital data and derived in response thereto and at a predetermined delay after reproduction of all said predetermined number of consecutive samples of the original signal, and for generating a remaining error signal indicating the presence of uncorrectable errors in the decoded information;
said selected time of said initial error signal generating means being substantially the same as said predetermined delay;
switch means for selectively providing to an output line of the apparatus either the analog signal reproduced from the tape or the decoded information; and
switching signal generating means for providing a switching signal to actuate said switch means to provide the analog signal being reproduced from the tape to the output line only in response to the simultaneous generation of said initial error signal and said remaining error signal;
said apparatus further including a digital reproducing section and an analog reproducing section, wherein:
said digital reproducing section comprises a digital reproducing means for reproducing from the tape and providing to said error-detecting means encoded digital data;
said error-detecting means provides the encoded digital data to said decoding means, said decoding means receiving all samples of a given group of consecutive samples of the original signal and said predetermined delay comprising the time between reproduction of the first sample of a group and the generation of said remaining error signal;
said decoding means includes a decoder for providing decoded digital comprising said consecutive information words in their original order, an interpolator for generating in response to said remaining error signal a replacement for any missing information word in the output of the decoder and a digital-to-analog converter for converting the decoded digital data into its original analog form for supply to said switch means;
said switch means provides said converted analog signal from said converter to an output line of the apparatus until actuated by said switching signal;
said switching signal generating means provide said switching signal to said switch means at a predetermined switching delay after the digital data causing said remaining error signal was reproduced from the tape;
said analog reproducing section comprises an analog reproducing means and means for providing the corresponding analog signal to said switch means at a predetermined analog delay after the respective portion of the analog signal was reproduced from the tape; and said digital and analog reproducing means are spaced from each other a predetermined distance so that said switching delay is substantially equal to said analog delay plus the time required for the portion of the analog signal generally corresponding to the digital data causing said remaining error to reach said analog reproducing means after reproduction of the digital data causing said remaining error signal.

7. Apparatus as in claim 6; wherein:

said decoder receives out of order a given group of distributed consecutive samples of the original signal, said switching delay comprising the time between the reproduction by said digital reproducing means of the first digital information word of a group and the generation of said remaining error signal; and said analog signal is recorded on the tape with the portion corresponding to the first sample of each group of the original signal generally aligned transverse to the direction of the tape travel with the data block containing the corresponding digital information word.

8. Apparatus as in claim 7; wherein:

said error-detecting means further comprises a drop-out detector for generating a drop-out signal indicating the absence of digital data being reproduced from the tape; and said initial error signal generating means provides said initial error signal when said drop-out signal indicates the absence of digital data being reproduced from the tape for a predetermined duration substantially the same as the time required to reproduce said predetermined number of consecutive data blocks having an error therein.

9. Apparatus as in claim 8; wherein said initial error signal generating means includes:

an OR circuit for providing an OR pulse in response to either one of said drop-out signal and said detecting signal; and a width detector for generating said initial error signal in response to said OR pulse.

10. Apparatus as in claim 9; wherein said switching signal generating means comprises:

an AND circuit for providing an AND pulse when both said initial error signal and said remaining error signal are received by said AND circuit; and a flip-flop circuit operative in response to said AND pulse for providing a one-way switching signal to said switch means for providing to said output line said analog signal instead of said digital signal.

11. A method of providing an analog signal from a recording medium in lieu of a corresponding encoded digital signal recorded thereon when errors are present in the digital data being reproduced from the medium, the method comprising;

generating a detecting signal indicating the existence of errors in the encoded digital data being reproduced from the medium;

generating an initial error signal when said detecting signal indicates that at least a predetermined portion of the digital data being reproduced from the medium contains errors;

decoding the encoded digital data and generating in response thereto corresponding error-corrected decoded information and a remaining error signal indicating the presence in the decoded information of an uncorrectable error, said remaining error signal being generated after a predetermined delay from the reproduction of the encoded data; and providing the analog signal from the medium in lieu of the decoded information when both said initial error signal and said remaining error signal are present.

12. A method as in claim 11; wherein:

the medium is a longitudinally extending tape having digital data arranged thereon in substantially regular data blocks, each of which includes an associated error-detecting word for indicating the presence of an error in the data in the associated block;

said detection signal is generated in response to said error-detecting words; and said initial error signal is generated in response to the indication by said detection signal of an error in a predetermined number of consecutive data blocks.

13. A method as in claim 12; further comprising the steps of:

providing a drop-out signal in response to the absence of digital data being reproduced from the tape; and generating said detection signal when said drop-out signal lasts a predetermined duration substantially the same as the time required to reproduce said predetermined number of consecutive data blocks.

14. A method as in claim 13, wherein:

the digital data on the tape is derived by sampling groups of an original analog signal at a predetermined rate and generating corresponding digital information words arranged on the medium with a predetermined number of information words in each data block and with the same predetermined number of consecutive samples of the original signal being distributed in order among a predetermined plurality of data blocks;

said analog signal is recorded on the tape with the portion corresponding to the first sample of a given group of samples of the original signal generally aligned transverse to the direction of tape travel with the data block containing the corresponding digital information word;

said predetermined duration is substantially the same as said predetermined delay; and said analog signal is provided from the first sample of a given group of samples of the original signal whenever any digital information words derived from said group cannot be corrected.

* * * * *

UNITED STATES PATENT AND TRADEMARK OFFICE
CERTIFICATE OF CORRECTION

PATENT NO. : 4,853,798

DATED : August 1, 1989

INVENTOR(S) : Yukio Fukuju, et. al.

It is certified that error appears in the above-identified patent and that said Letters Patent is hereby corrected as shown below: On the title page:

Change inventors name from "Yujio to --Yukio--

Col. 2, line 24, before "data" insert --depict--

Col. 3, line 37, change "W2" to --W12--

Col. 5, line 56, after "W1)" insert --.--

Col. 8, line 16, change "ca" to --can--

In Claims:

Col. 9, line 6, change "o" to --of-- line 57, change "produced" to --reproduced-- line 60, after "blocks" second occurence, insert --being--

Col. 10, line 50, after "digital" insert --data-

Signed and Sealed this

Third Day of July, 1990

*Attest:*

HARRY F. MANBECK, JR.

*Attesting Officer*  *Commissioner of Patents and Trademarks*